(12) United States Patent
Zimmerman et al.

(10) Patent No.: US 12,074,274 B2
(45) Date of Patent: Aug. 27, 2024

(54) SOLID STATE BIPOLAR BATTERY

(71) Applicant: Ionic Materials, Inc., Woburn, MA (US)

(72) Inventors: Michael A. Zimmerman, No. Andover, MA (US); Randy Leising, No. Andover, MA (US)

(73) Assignee: Ionic Materials, Inc., Woburn, MA (US)

( * ) Notice: Subject to any disclaimer, the term of this patent is extended or adjusted under 35 U.S.C. 154(b) by 0 days.

(21) Appl. No.: 18/220,063

(22) Filed: Jul. 10, 2023

(65) Prior Publication Data

US 2023/0352726 A1     Nov. 2, 2023

Related U.S. Application Data

(63) Continuation of application No. 15/579,503, filed as application No. PCT/US2016/036010 on Jun. 6, (Continued)

(51) Int. Cl.
| | |
|---|---|
| *H01M 10/056* | (2010.01) |
| *H01M 4/131* | (2010.01) |
| *H01M 4/48* | (2010.01) |
| *H01M 6/18* | (2006.01) |
| *H01M 8/0202* | (2016.01) |
| *H01M 10/04* | (2006.01) |
| *H01M 10/052* | (2010.01) |
| *H01M 10/0565* | (2010.01) |
| *H01M 10/058* | (2010.01) |

(Continued)

(52) U.S. Cl.
CPC ......... *H01M 10/056* (2013.01); *H01M 4/131* (2013.01); *H01M 4/48* (2013.01); *H01M 6/181* (2013.01); *H01M 8/0202* (2013.01); *H01M 10/0418* (2013.01); *H01M 10/052* (2013.01); *H01M 10/0565* (2013.01); *H01M 10/058* (2013.01); *H01M 10/0585* (2013.01); *H01M 2004/029* (2013.01); *H01M 2300/0082* (2013.01); *Y02T 10/70* (2013.01)

(58) Field of Classification Search
CPC ........... H01M 10/0418; H01M 10/056; H01M 10/0562; H01M 10/058; H01M 10/0585
See application file for complete search history.

(56) References Cited

U.S. PATENT DOCUMENTS

| | | |
|---|---|---|
| 2,638,489 A | 5/1953 | Ruben |
| 3,257,241 A | 6/1966 | Tamminen |

(Continued)

FOREIGN PATENT DOCUMENTS

| | | |
|---|---|---|
| CN | 1326596 | 12/2001 |
| CN | 1354529 | 6/2002 |

(Continued)

OTHER PUBLICATIONS

Ahmad et al., Structural studies and ionic conductivity of lithium iodide-lithium tungstate solid electrolytes. Ionics, 2002, 8, pp. 433-438 (2002).

(Continued)

*Primary Examiner* — Amanda C. Walke
(74) *Attorney, Agent, or Firm* — ArentFox Schiff LLP; Joseph Maraia

(57) ABSTRACT

A bipolar battery having a solid ionically conductive polymer material as its electrolyte enabling high voltage discharge.

20 Claims, 6 Drawing Sheets

Related U.S. Application Data 2016, now Pat. No. 11,749,833, which is a continuation-in-part of application No. 15/148,085, filed on May 6, 2016, now Pat. No. 11,251,455, and a continuation-in-part of application No. 14/676,173, filed on Apr. 1, 2015, now Pat. No. 11,145,857, and a continuation-in-part of application No. 14/559,430, filed on Dec. 3, 2014, now Pat. No. 9,742,008, and a continuation-in-part of application No. 13/861,170, filed on Apr. 11, 2013, now Pat. No. 9,819,053.

(60) Provisional application No. 62/170,959, filed on Jun. 4, 2015, provisional application No. 62/158,841, filed on May 8, 2015, provisional application No. 61/973,325, filed on Apr. 1, 2014, provisional application No. 61/911,049, filed on Dec. 3, 2013, provisional application No. 61/622,705, filed on Apr. 11, 2012.

(51) Int. Cl.
*H01M 10/0585* (2010.01)
*H01M 4/02* (2006.01)

(56) References Cited

U.S. PATENT DOCUMENTS

| | | |
|---|---|---|
| 3,336,279 A | 8/1967 | Scott |
| 3,502,606 A | 3/1970 | Conciatori et al. |
| 4,243,732 A | 1/1981 | Powers et al. |
| 4,465,744 A | 8/1984 | Susman et al. |
| 4,471,037 A | 9/1984 | Bannister |
| 4,556,165 A | 12/1985 | Yamawacki et al. |
| 4,654,279 A | 3/1987 | Bauer et al. |
| 4,720,910 A | 1/1988 | Rourke et al. |
| 4,804,594 A | 2/1989 | Jow et al. |
| 4,925,751 A | 5/1990 | Shackle et al. |
| 5,147,739 A | 9/1992 | Beard |
| 5,160,880 A | 11/1992 | Palanisamy |
| 5,169,494 A | 12/1992 | Hashimoto et al. |
| 5,227,043 A | 7/1993 | Shakushiro et al. |
| 5,270,137 A | 12/1993 | Kubota |
| 5,378,560 A | 1/1995 | Tomiyama |
| 5,403,675 A | 4/1995 | Ogata et al. |
| 5,424,151 A | 6/1995 | Koksbang et al. |
| 5,462,566 A | 10/1995 | Skotheim |
| 5,506,073 A | 4/1996 | Angell et al. |
| 5,518,841 A | 5/1996 | Sotumura |
| 5,569,559 A | 10/1996 | Fauvarque |
| 5,582,937 A | 12/1996 | LaFollette |
| 5,599,355 A | 2/1997 | Nagasubramanian et al. |
| 5,620,811 A | 4/1997 | Zhang et al. |
| 5,648,187 A | 7/1997 | Skotheim |
| 5,660,953 A | 8/1997 | Bai et al. |
| 5,688,613 A | 11/1997 | Li et al. |
| 5,713,169 A | 2/1998 | Meier et al. |
| 5,882,621 A | 3/1999 | Doddapaneni et al. |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,162,563 A | 12/2000 | Miura et al. |
| 6,183,914 B1 | 2/2001 | Yao et al. |
| 6,248,474 B1 | 6/2001 | Nishiyama et al. |
| 6,274,261 B1 | 8/2001 | Tinker et al. |
| 6,274,681 B1 | 8/2001 | Inagaki et al. |
| 6,358,651 B1 | 3/2002 | Chen et al. |
| 6,376,123 B1 | 4/2002 | Chu |
| 6,413,676 B1 | 7/2002 | Munshi et al. |
| 6,451,487 B1 | 9/2002 | Besner et al. |
| 6,455,202 B1 | 9/2002 | Marugan et al. |
| 6,461,724 B1 | 10/2002 | Radovanovic et al. |
| 6,630,271 B1 | 10/2003 | Arcella et al. |
| 6,645,675 B1 | 11/2003 | Munshi |
| 6,652,440 B1 | 11/2003 | Kovalev et al. |
| 6,664,006 B1 | 12/2003 | Munshi |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,906,556 B2 | 12/2014 | Hambitzer |
| 8,945,432 B2 | 2/2015 | Towns |
| 9,742,008 B2 | 8/2017 | Zimmerman et al. |
| 9,819,053 B1 | 11/2017 | Zimmerman |
| 10,199,657 B2 | 2/2019 | Zimmerman |
| 10,553,901 B2 | 2/2020 | Zimmerman et al. |
| 10,559,827 B2 | 2/2020 | Zimmerman et al. |
| 10,741,877 B1 | 8/2020 | Zimmerman et al. |
| 10,811,688 B2 | 10/2020 | Zimmerman et al. |
| 11,031,599 B2 | 6/2021 | Zimmerman et al. |
| 11,114,655 B2 | 9/2021 | Zimmerman et al. |
| 11,145,857 B2 | 10/2021 | Zimmerman et al. |
| 11,145,899 B2 | 10/2021 | Zimmerman et al. |
| 11,152,657 B2 | 10/2021 | Zimmerman et al. |
| 11,251,455 B2 | 2/2022 | Zimmerman et al. |
| 11,319,411 B2 | 5/2022 | Zimmerman |
| 11,342,559 B2 | 5/2022 | Zimmerman et al. |
| 11,611,104 B2 | 3/2023 | Zimmerman |
| 11,749,833 B2 | 9/2023 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2002/0177043 A1 | 11/2002 | Ndzebet et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2003/0209692 A1 | 11/2003 | Farrand et al. |
| 2004/0023116 A1 | 2/2004 | Fujino et al. |
| 2004/0076881 A1 | 4/2004 | Bowden et al. |
| 2004/0157101 A1 | 8/2004 | Smedley |
| 2004/0229118 A1 | 11/2004 | Wensley et al. |
| 2004/0241553 A1 | 12/2004 | Abe et al. |
| 2004/0253520 A1 | 12/2004 | Wensley et al. |
| 2005/0019661 A1 | 1/2005 | Han et al. |
| 2005/0112458 A1 | 5/2005 | Dopp et al. |
| 2005/0112471 A1 | 5/2005 | Chen et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 | 1/2006 | Shimoyama et al. |
| 2006/0166085 A1 | 7/2006 | Hennige et al. |
| 2006/0269834 A1 | 11/2006 | West et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2007/0287069 A1 | 12/2007 | Fukui |
| 2008/0066297 A1 | 3/2008 | Lin et al. |
| 2008/0090138 A1 | 4/2008 | Vu et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2008/0300380 A1 | 12/2008 | Bai et al. |
| 2009/0162755 A1 | 6/2009 | Neudecker |
| 2009/0197183 A1 | 8/2009 | Kato |
| 2009/0246636 A1 | 10/2009 | Chiang et al. |
| 2009/0272731 A1 | 11/2009 | Olding et al. |
| 2010/0227224 A1 | 9/2010 | Eitouni et al. |
| 2011/0020708 A1 | 1/2011 | Fujiki et al. |
| 2011/0027666 A1 | 2/2011 | Burchardt et al. |
| 2011/0070487 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |

(56) References Cited

U.S. PATENT DOCUMENTS

| | | |
|---|---|---|
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0082901 A1 | 4/2012 | Schmidt et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 | 7/2012 | Wakizaka et al. |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2013/0224632 A1 | 8/2013 | Roumi |
| 2014/0004431 A1 | 1/2014 | Yamaguchi et al. |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0349160 A1 | 11/2014 | Kato et al. |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera |
| 2016/0254514 A1 | 9/2016 | Roumi |
| 2016/0365553 A1 | 12/2016 | Kountz et al. |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2017/0271731 A1 | 9/2017 | Hayashi et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0212232 A1 | 7/2018 | Zimmerman et al. |
| 2018/0219210 A1 | 8/2018 | Kim |
| 2018/0241031 A1 | 8/2018 | Pan et al. |
| 2019/0067764 A1 | 2/2019 | Zimmerman et al. |
| 2020/0358107 A9 | 11/2020 | Zimmerman et al. |

FOREIGN PATENT DOCUMENTS

| | | |
|---|---|---|
| CN | 1372705 | 10/2002 |
| CN | 1457518 | 11/2003 |
| CN | 1592937 | 3/2005 |
| CN | 1788375 | 6/2006 |
| CN | 1319204 | 5/2007 |
| CN | 1965436 | 5/2007 |
| CN | 101290985 | 10/2008 |
| CN | 101542790 | 9/2009 |
| CN | 103140963 A | 6/2013 |
| CN | 103151554 A | 6/2013 |
| CN | 106165154 | 11/2016 |
| CN | 106489217 | 3/2017 |
| CN | 107980185 | 5/2018 |
| EP | 0145498 | 6/1985 |
| JP | S59-157151 | 9/1984 |
| JP | H04-267055 | 9/1992 |
| JP | H07-271074 | 10/1995 |
| JP | H09-219197 | 8/1997 |
| JP | 2002538585 | 11/2002 |
| JP | 2002352799 | 12/2002 |
| JP | 2002358959 | 12/2002 |
| JP | 2003508886 | 3/2003 |
| JP | 2003242961 | 8/2003 |
| JP | 2003242964 | 8/2003 |
| JP | 2004265675 | 9/2004 |
| JP | 2005535076 | 11/2005 |
| JP | 2006049122 | 2/2006 |
| JP | 2006210089 | 8/2006 |
| JP | 2006520519 | 9/2006 |
| JP | 2007080642 | 3/2007 |
| JP | 2008192621 | 8/2008 |
| JP | 2010509719 | 3/2010 |
| JP | 2011028976 | 2/2011 |
| JP | 2011228219 | 11/2011 |
| JP | 2012517519 | 8/2012 |
| JP | 2012522336 | 9/2012 |
| JP | 2014067638 | 4/2014 |
| JP | 2014112560 | 6/2014 |
| JP | 2014167910 A | 9/2014 |
| JP | 2014-199824 A | 10/2014 |
| JP | 2015005493 | 8/2015 |
| JP | 2015529945 | 10/2015 |
| KR | 1020040047780 | 6/2004 |
| KR | 1020080023294 | 3/2008 |
| KR | 1020080094571 | 10/2008 |
| KR | 1020090040431 | 4/2009 |
| KR | 1020110106342 | 9/2011 |
| KR | 1020120117853 | 10/2012 |
| KR | 20140102567 | 8/2014 |
| WO | 1998042037 | 9/1998 |
| WO | 1999033127 | 7/1999 |
| WO | 2000016422 | 3/2000 |
| WO | 2001017051 | 3/2001 |
| WO | 2001026175 | 4/2001 |
| WO | 2004027909 | 4/2004 |
| WO | 2004102694 | 11/2004 |
| WO | 2006019064 | 2/2006 |
| WO | 2010061452 | 6/2010 |
| WO | 2011146670 | 11/2011 |
| WO | 2014020349 | 2/2014 |
| WO | 2015084940 | 6/2015 |
| WO | 2015153729 | 10/2015 |
| WO | 2016182884 | 11/2016 |
| WO | 2016196477 | 12/2016 |
| WO | 2016196873 | 12/2016 |
| WO | 2016197098 | 12/2016 |
| WO | 2019065066 | 4/2019 |
| WO | 2019126532 | 6/2019 |
| WO | 2020005700 | 1/2020 |
| WO | 2021161521 | 8/2021 |

OTHER PUBLICATIONS

Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_ TSP-07Issue3.pdf>. entire document.

Brady, D.G. "The crystallinity of poly(phenylene sulfide) and its effect on polymer properties," Journal of Applied Polymer Science, 1976, 20, 2541-2551.

Candlin, J. "Polymers" within "The Chemical Industry: Second Edition." Edited by Alan Heaton. 1994. Spring Science+Business Media Dordrecht, pp. 116-121.

Celazole® T-Series: Injection Molding Thermoplastic Polymers. Brochure of PBI Performance Products, Inc., 2013.

Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.

(56) References Cited

OTHER PUBLICATIONS

Croce et al., "Nanocomposite polymer electrolytes for lithium batteries," Nature, vol. 394, pp. 456-458 (Jul. 30, 1998).

Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.

Definition of Dopant. http://www.merriam-webster.com/dictionary/dopant. Downloaded Feb. 4, 2019.

Definition of Nonflammable. Http://www.dictionary.com/browse/nonflammable?s+t. As viewed on Jun. 7, 2016.

Diez-Pascual, A. et al., "High-Performance Aminated Poly(phenylene sulfide)/ZnO Nanocomposites for Medical Applications," ACS Applied Materials & Interfaces 6, No. 13 (Jun. 13, 2014), pp. 10132-10145.

Diez-Pascual, A.M. et al., "Inorganic nanoparticle-modified poly(phenylene sulphide)/carbon fiber laminates: thermomechanical behaviors," Materials, 2013, 6, pp. 3171-3193.

Edman et al., "Transport properties of the Solid Polymer Electrolyte System P(EO)nLiTFSI," Journal of Physical Chemistry B, vol. 104, No. 15, pp. 3476-3480 (2000).

Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_Selected_Apps_EN.pdf.

Ferrando, W.A., "Development of a Novel Composite Aluminum Anode," Journal of Power Sources, vol. 130, Issues 102, pp. 309-314, May 2004. Abstract only.

Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.

Gal'Perin et al., Determination of the crystallinity of polyvinylidene fluoride. Polymer Science: USSR 1970, 12, pp. 2133-2139 (1970).

Hayashi, A. et al., "Superionic glass-ceramic electrolytes for room-temperature rechargeable sodium batteries," Nature Communications, 3:856 (May 22, 2012) 1-5.

Imrie, C.T. et al., "Ion Transport in Glassy Polymer Electrolytes," Journal of Physical Chemistry B, vol. 103, pp. 4132-4138, 1999.

Kosters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.

Lee et al., PVDF-based nanocomposite solid polymer electrolytes; the effect of affinity between PVDF and filler on ionic conductivity. Composite Interfaces 2009, 16, 347-358.

Lefkowitz et al., "Influence of pH on the Reductive Transformation of Birnessite by Aqueous Mn(II)," Environmental Science & Technology, vol. 47, pp. 10364-10371, 2013.

Lefrou, C. et al., "Electrochemistry: The Basics, With Examples." Springer-Verlag Berlin Heidelberg, pp. 22-25, 2012.

Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.

Liew, C.-W. et al., "Characterization of ionic liquid added poly(vinyl alcohol)-based proton conducting polymer electrolytes and electrochemical studies on the supercapacitors," International Journal of Hydrogen Energy, vol. 40, pp. 852-862, 2015.

Lithium Iodide Information. ChemBook. http://www.chemicalbook.com/ChemicalProductProperty_EN_cb8688141.htm. As viewed on Apr. 25, 2017.

Liu et al., "Effect of Preparation Methods on Crystallization Behavior and Tensile Strength of Poly(vinylidene fluoride) Membranes," Membranes, 2013, 3, 389-405.

Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.

Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.

Lu, Y-C. et al. "Catalytic Activity Trends of Oxygen Reduction Reaction for Nonaqueous Li-Air Batteries Supporting Information," Nov. 1, 2011, XP055630428, URL: https://pubs.acs.org/doi/suppl/10.1021/ja 208608s/suppl_file/ja208608S-si_001.pdf.

Miyatake, K. et al., "Synthesis of poly(phenylene sulfide sulfonic acid) via poly(sulfoniumcation) as a thermostable proton-conducting polymer," Macromolecules 29.21, pp. 6969-6971 (1996).

Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).

Nohara, L. B. et al., "Study of crystallization behavior of poly(phenylene sulfide)," Polimeros: Ciencia e tecnologia, 16, pp. 104-110 (2006).

OPI Online Courses, "Insulator, Semiconductor Conductor," (online), Jul. 1, 2012.

PBI Information. Polymers: A Property Database 2017, CRC Press, Taylor & Francis Group (2017).

Persson et al., "Materials Data on MnO2 (SG:164) by Materials Project," database entry #mp-25558, Nov. 2014 [retrieced via <https://doi.org/10.17188/1200755>].

Polyacrylonitrile Information. ChemicalBook. http://www.chemicalbook.com/ChemicalProductProperty_USCB9199592.aspx. As viewed on Jan. 18, 2018.

Polymer Density Table. ScientificPolymer. http://scientificpolymer.com/density-of-polymers-by-density/. As viewed on Mar. 11, 2015.

Polyphenylene Sulfide Information. DIC Corporation. http://www.dic-global.com/us/en/products/pps/about.html. Downloaded on Jun. 8, 2016.

Polystyrene, Wikipedia. https://en.wikipedia.org/wiki/Polystyrene. Downloaded Feb. 4, 2019.

Polyvinylidenefluoride (PVDF) Information, Goodfellow, http://www.goodfellow.com/E/Polyvinylidenefluoride.html. As viewed on Jan. 18, 2018.

Sandor, R.B., "Pbi (Polybenzimidazole): Synthesis, Properties and Applications," High Performance Polymers, vol. 2, No. 1, pp. 25-37, 1990.

Sannigrahi, A. et al., "Tuning the Molecular Properties of Polybenzimidazole by Copolymerization," Journal of Physical Chemistry B, vol. 111, pp. 12124-12132, 2007.

Santhosh, P. et al., "Preparation and properties of new cross-linked polyurethane acrylate electrolytes for lithium batteries," Journal of Power Sources 160, pp. 609-620, 12 pps. (2006).

Sigma-Aldritch Materials Science Products. Pi-conjugated Polymers, Jun. 5, 2014 (Jun. 5, 2014) [retrieced on Aug. 9, 2016]. Retrieved from the Internet: <URL: http://www.sigmaaldrich.com/materials-science/material-science-products.html?TablePage=111775702>. entire document.

Solvay. Ryton PPS. Feb. 7, 2015 (Feb. 7, 2015) [retrieved on Aug. 9, 2016]. Retrieved from the Internet: <URL:http://www.solvay.com/en/markets-and-products/featured-products/Ryton-PPS-htmlf>. entire document.

Spry, R.J. et al., Anisotropic Ionic Conductivity of Lithium-Doped Sulfonated PBI, Journal of Polymer Science: Part B: Polymer Physics, 35, 2925-2933 ( 1997).

Suib, S.L., New and future developments in catalysis: Batteries, Hydrogen Storage and Fuel Cells. Elsevier B.V. Jul. 29, 2013, pp. 1-16.

Taib, N. U. et al., "Plastic crystal-solid biopolymer electrolytes for rechargeable lithium batteries," Journal of Membrane Science, vol. 468, pp. 149-154, 2014.

Teng, H., "Overview of the development of the fluoropolymer Industry," Applied Sciences, 2012, vol. 2, pp. 496-512.

Tokito et al., Electrical Conductivity and Optical Properties of Poly(p-phenylene sulfide) doped with Some Organic Acceptors. Polymer Journal, vol. 17, No. 8, pp. 959-968.1985. Retrieved from the Internet<URL:HTTP:// www.nature.com/pj/ journal/v17/n8/pdf/pj1985103a.pdf.> entire document.

Wang et al., "The effects of Mn loading on the structure and ozone decomposition activity of MnOx supported on activated carbon," Chinese Journal of Catalysis, vol. 35, No. 3, pp. 335-341 (Mar. 13, 2014).

Wikipedia entry of Electrolyte. https://en.wikipedia.org/wiki/Electrolyte. Downloaded Feb. 1, 2019.

(56) References Cited

OTHER PUBLICATIONS

Wu, G.M. et al., "Alkaline Zn-air and Al-air cells based on novel solid PVA/PM polymer electrolyte membranes," Journal of Membrane Science, 280, pp. 802-808, Elsevier B.V. (2006; published online Apr. 4, 2006).

Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with the translator signature is attached.

Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, (2008).

Ye et al., "Dictionary of Weapon Industry Science and Technology Exploder," edited by Ye Ying, National Defense Industry Press, published in Dec. 1991, pp. 13-134.

Yu et al., "Solution-combustion synthesis of epsilo-MnO2 for supercapacitors," Materials Letters, vol. 64, pp. 61-64 (Oct. 9, 2009).

Zak, A. K. et al., "Synthesis and characterization of a narrow size distribution of zinc oxide nanoparticles," International Journal of Nanomedicine, 6, pp. 1399-1403 (2011).

Zhang, Z. et al., "All-solid-state Al-air batteries with polymer alkaline gel electrolyte," Journal of Power Sources., 251, pp. 470-475, Elsevier B.V (2014; available online Nov. 20, 2013).

First Office Action in Chinese Application No. 202110793594.6 dated Aug. 10, 2023 (with English translation), 8 pages.

Communication pursuant to Article 94(3) EPC mailed Jun. 3, 2024, for Application No. EP16804636.5 (5 pages).

SOLID STATE BIPOLAR BATTERY

CROSS-REFERENCE TO RELATED APPLICATIONS

This application is a continuation of U.S. patent application Ser. No. 15/579,503 filed Dec. 4, 2017, which is a national stage entry of International Patent Application No. PCT/US2016/036010 filed Jun. 6, 2016, which claims priority to U.S. Provisional Patent Application No. 62/170,959 filed Jun. 4, 2015. International Patent Application No. PCT/US2016/036010 is a continuation-in-part of U.S. patent application Ser. No. 15/148,085 filed May 6, 2016 (now U.S. Pat. No. 11,251,455, issued Feb. 15, 2022), which claims priority to U.S. Provisional Patent Application No. 62/158,841 filed May 8, 2015. International Patent Application No. PCT/US2016/036010 is a continuation-in-part of U.S. patent application Ser. No. 14/676,173 filed Apr. 1, 2015 (now U.S. Pat. No. 11,145,857, issued Oct. 12, 2021), which claims priority to U.S. Provisional Patent Application No. 61/973,325 filed Apr. 1, 2014. International Patent Application No. PCT/US2016/036010 is a continuation-in-part of U.S. patent application Ser. No. 14/559,430 filed Dec. 3, 2014 (now U.S. Pat. No. 9,742,008, issued Aug. 22, 2017), which claims priority to U.S. Provisional Patent Application No. 61/911,049 filed Dec. 3, 2013. International Patent Application No. PCT/US2016/036010 is a continuation-in-part of U.S. patent application Ser. No. 13/861,170 filed Apr. 11, 2013 (now U.S. Pat. No. 9,819,053, issued Nov. 14, 2017), which claims priority to U.S. Provisional Patent Application No. 61/622,705 filed Apr. 11, 2012. The entire contents of each of these applications is incorporated by reference herein.

FIELD OF THE INVENTION

One or more embodiments relate to bipolar electrodes including a solid ionically conductive polymer material, manufacturing methods thereof, and bipolar batteries containing the same.

BACKGROUND OF THE INVENTION

U.S. Pat. No. 627,009 describes a lead acid battery constructed in such a way that the "end electrodes and intermediate electrodes are connected in electrical series . . . so that [the current collector] forms the sole conducting connection between the opposite sides of each of the intermediate electrodes." Bipolar batteries have struggled to overcome the challenge of isolating the liquid electrolyte to prevent communication and short circuiting across cells.

Typical bipolar batteries have focused on using costly and complicating internal sealing mechanisms to contain liquid electrolytes to their individual cells. To avoid using sealing mechanisms, low conductivity solid electrolytes and liquid gel electrolyte with seals have been tried in bipolar designs. However low ionic conductivity and high internal impedance has limited the performance of such design.

The present embodiments overcome the above problems as well as provide additional advantages.

SUMMARY OF THE INVENTION

According to an aspect, a bipolar battery including at least one bipolar electrode, each having a positive electrode comprising a first electrochemically active material on one side of an electrically conducting sheet and a negative electrode comprising a second electrochemically active material on the other side of the sheet; a plurality of electrolyte layers, each comprising a solid ionically conductive polymer material, both a terminal negative electrode and terminal positive electrode bounding the bipolar battery as the outside layers of the battery, wherein the terminal negative electrode is located opposed to a positive electrode located on a first adjacent bipolar electrode with an electrolyte layer interposed therebetween, wherein the terminal positive electrode is located opposed to a negative electrode layer on a second bipolar electrode with an electrolyte layer interposed therebetween; wherein the solid ionically conductive polymer material has a glassy state at room temperature, and comprises both at least one cationic and anionic diffusing ion, wherein at least one diffusing ion is mobile in the glassy state.

In the aspect of the bipolar battery, each positive electrode and the adjacent anode comprise a sub-stack which also includes an interposed electrolyte layer, wherein each sub-stack is separated from an adjacent sub-stack by an electrically conductive sheet, wherein each sub-stack has a voltage.

Further aspects of the battery can include one or more of the following.

The bipolar battery, wherein the voltage of each sub-stack is equal to or less than 3 volts. The bipolar battery, wherein the first electrochemically active material comprises zinc, aluminum, lithium or an intercalation material.

The bipolar battery, wherein the second electrochemically active material comprises manganese dioxide, sulfur or an intercalation material.

The bipolar battery further comprising a second sub-stack comprising a second separator layer comprising solid ionically conductive polymer electrolyte positioned between a second anode and second cathode layer, wherein said second sub-stack is positioned adjacent and in electrical and ionic communication with said first sub-stack and further comprising a third current collector layer positioned adjacent second sub-stack and opposed from said first current collector layer.

The bipolar battery wherein each positive electrode comprises the solid ionically conductive polymer material.

The bipolar battery wherein each negative electrode comprises the solid ionically conductive polymer material.

The bipolar battery, wherein the voltage of the battery is greater than 8 volts, and the distance between the terminal positive electrode and the terminal negative electrode is less than six millimeters.

The bipolar battery wherein the electrolyte layer is extruded.

The bipolar battery wherein the positive electrode is extruded.

In the aspect, the battery the solid ionically conductive polymer electrolyte further comprises: a crystallinity greater than 30%; a melting temperature; a glassy state; and wherein at least one diffusing ion is mobile in the glassy state.

The battery wherein the solid ionically conductive polymer material further comprises a plurality of charge transfer complexes. The battery wherein solid ionically conductive polymer material comprises a plurality of monomers, and wherein each charge transfer complex is positioned on a monomer.

The battery wherein the electronic conductivity of the solid ionically conductive polymer material is less than $1\times10^{-8}$ S/cm at room temperature.

The battery wherein the solid ionically conductive polymer material comprises: a plurality of monomers; a plurality of charge transfer complexes, wherein each charge transfer complex is positioned on a monomer; wherein the electronic conductivity of the solid ionically conductive polymer electrolyte is less than $1\times10^{-8}$ S/cm at room temperature.

The battery wherein the crystallinity of the solid ionically conductive polymer material is greater than 30%.

The battery wherein the solid ionically conductive polymer material has a glassy state which exists at temperatures below the melting temperature of the solid ionically conductive polymer material.

The battery wherein the solid ionically conductive polymer material further comprises both a cationic and anionic diffusing ion, whereby at least one diffusing ion is mobile in a glassy state of the solid ionically conductive polymer electrolyte, and wherein the crystallinity of the solid ionically conductive polymer electrolyte is greater than 30%.

The battery wherein the melting temperature of the solid ionically conductive polymer material is greater than 250° C.

The battery wherein the solid ionically conductive polymer material is a thermoplastic.

The battery wherein the ionic conductivity of the solid ionically conductive polymer material is isotropic.

The battery wherein the solid ionically conductive polymer material is non-flammable.

The battery wherein the Young's modulus of the solid ionically conductive polymer material is equal to or greater than 3.0 MPa.

The battery wherein the solid ionically conductive polymer material has a glassy state, and at least one cationic and at least one anionic diffusing ion, wherein each diffusing ion is mobile in the glassy state.

The battery wherein the ionic conductivity of the solid ionically conductive polymer material is greater than $1.0\times10^{-5}$ S/cm at room temperature.

The battery wherein the solid ionically conductive polymer electrolyte comprises a single cationic diffusing ion, wherein the single anionic diffusing ion comprises lithium, and wherein the diffusivity of the cationic diffusing ion is greater than $1.0\times10^{-12}$ m$^2$/s at room temperature. The battery wherein the solid ionically conductive polymer material comprises a single anionic diffusing ion, and wherein the diffusivity of the anionic diffusing ion is greater than $1.0\times10^{-12}$ m$^2$/s at room temperature.

The battery wherein one of the at least cationic diffusing ion, has a diffusivity greater than $1.0\times10^{-12}$ m$^2$/s.

The battery wherein one of the at least one anionic diffusing ion has a diffusivity greater than $1.0\times10^{-12}$ m$^2$/s.

The battery wherein one of both the at least one anionic diffusing ion and at least one cationic diffusing ion has a diffusivity greater than $1.0\times10^{-12}$ m$^2$/s.

The battery wherein solid ionically conductive polymer material has an ionic conductivity greater than $1\times10^{-4}$ S/cm at room temperature.

The battery wherein the solid ionically conductive polymer material has an ionic conductivity greater than $1\times10^{-3}$ S/cm at 80° C.

The battery wherein the solid ionically conductive polymer material has an ionic conductivity greater than $1\times10^{-5}$ S/cm at −40° C.

The battery wherein the concentration of lithium is greater than 3 moles of lithium per liter of the solid ionically conductive polymer material.

The battery wherein each at least one cationic and anionic diffusing ion have a diffusivity, wherein the cationic diffusivity is greater than the anionic diffusivity.

The battery wherein the cationic transference number of the solid ionically conductive polymer material is greater than 0.5 and less than 1.0.

The battery wherein at least one diffusing anion is monovalent.

The battery wherein at least one anionic diffusing ion comprises hydroxide, fluorine or boron.

The battery wherein the solid ionically conductive polymer material comprises a plurality of monomers and wherein there is at least one anionic diffusing ion per monomer.

The battery wherein the solid ionically conductive polymer material comprises a plurality of monomers and wherein there is at least one cationic diffusing ion per monomer.

The battery wherein there is at least one mole of the lithium per liter of solid ionically conductive polymer electrolyte.

The battery wherein the solid ionically conductive polymer material comprises a plurality of monomers, wherein each monomer comprises an aromatic or heterocyclic ring structure positioned in the backbone of the monomer. The battery wherein the solid ionically conductive polymer material further includes a heteroatom incorporated in the ring structure or positioned on the backbone adjacent the ring structure.

The battery wherein the heteroatom is selected from the group consisting of sulfur, oxygen or nitrogen.

The battery wherein the heteroatom is positioned on the backbone of the monomer adjacent the ring structure.

The battery wherein the heteroatom is sulfur.

The battery wherein the solid ionically conductive polymer material is pi-conjugated.

The battery wherein the solid ionically conductive polymer material comprises a plurality of monomers, wherein the molecular weight of each monomer is greater than 100 grams/mole.

The battery wherein the charge transfer complex is formed by the reaction of a polymer, electron acceptor, and an ionic compound, wherein each cationic and anionic diffusing ion is a reaction product of the ionic compound.

The battery wherein the solid ionically conductive polymer material is formed from at least one ionic compound, wherein the ionic compound comprises each at least one cationic and anionic diffusing ion.

The battery wherein the charge transfer complex is formed by the reaction of a polymer and an electron acceptor.

The battery wherein the solid ionically conductive polymer material becomes ionically conductive after being doped by an electron acceptor in the presence of an ionic compound that either contains both a cationic and anionic diffusing ion or is convertible into both the cationic and anionic diffusing ion via reaction with the electron acceptor.

The battery wherein the solid ionically conductive polymer material is formed from the reaction product of a base polymer, electron acceptor and an ionic compound.

The battery wherein the base polymer is a conjugated polymer.

The battery wherein the base polymer is PPS or a liquid crystal polymer.

The battery wherein the electrolyte layer is formed into a film, wherein the thickness of the film is between 200 and 15 micrometers.

The battery wherein the first electrochemically active material comprises an intercalation material. The battery wherein the first electrochemically active material comprises a lithium oxide comprising nickel, cobalt or manganese, or a combination of two or all three of these elements.

The battery wherein the first electrochemically active material has an electrochemical potential greater than 4.2 volts relative lithium metal.

The battery wherein the cathode has an electrode potential greater than 4.2 volts relative lithium metal.

The battery wherein the first electrochemically active material is intermixed with an electrically conductive material and the solid ionically conductive polymer electrolyte.

The battery wherein the electrically conductive material comprises carbon.

The battery wherein the cathode comprises 70-90 percent by weight of the first electrochemically active material.

The battery wherein the cathode comprises 4-15 percent by weight of the solid ionically conductive polymer material.

The battery wherein the cathode comprises 2-10 percent by weight of an electrically conductive material.

The battery wherein the electrically conductive material comprises carbon.

The battery wherein the cathode is formed from a slurry.

The battery wherein the cathode is positioned on a cathode collector.

The battery wherein the first electrochemically active material comprises a lithium oxide or a lithium phosphate that contain nickel, cobalt or manganese.

The battery wherein the first electrochemically active material comprises a lithium intercalation material, wherein the lithium intercalation material comprises lithium.

The battery wherein the lithium intercalation material comprises Lithium Nickel Cobalt Aluminum Oxide; Lithium Nickel Cobalt Manganese Oxide; Lithium Iron Phosphate; Lithium Manganese Oxide; Lithium cobalt phosphate or lithium manganese nickel oxide, Lithium Cobalt Oxide, $LiTiS_2$, $LiNiO_2$, or combinations thereof.

The battery wherein the first electrochemically active material comprises an electrochemically active cathode compound that reacts with lithium in a solid state redox reaction.

The battery wherein the electrochemically active cathode material comprises a metal halide; Sulfur; Selenium; Tellurium; Iodine; $FeS_2$ or $Li_2S$. The battery wherein the lithium intercalation material comprises Lithium Nickel Cobalt Manganese Oxide, wherein the atomic concentration of nickel in the Lithium Nickel Cobalt Manganese Oxide is greater than the atomic concentration of cobalt or manganese.

The battery wherein the cathode is about 15 to 115 micrometers in thickness.

The battery wherein the cathode coating density in the range of 1.2 to 3.6 g/cc.

The battery wherein the second electrochemically active material comprises an intercalation material.

The battery wherein the anode further comprises the solid ionically conductive polymer material, wherein the first electrochemically active material is mixed with the solid ionically conductive polymer material.

The battery wherein the second electrochemically active material comprises lithium metal.

The battery wherein the lithium metal in the anode 20 micrometers or less in thickness. The battery further comprising an anode current collector in ionic communication with the anode, wherein lithium deposits on a current collector when the battery is charged.

The battery wherein the density of the lithium deposited on the anode or anode side of the current collector is greater than 0.4 g/cc.

The battery wherein the second electrochemically active material comprises Silicon, Tin, antimony, lead, Cobalt, Iron, Titanium, Nickel, magnesium, aluminum, gallium, Germanium, phosphorus, arsenic, bismuth, zine, carbon and mixtures thereof.

The battery wherein the second electrochemically active material comprises an intercalation material, wherein the first electrochemically active material comprises lithium metal.

The battery wherein a diffusing ion is cycled between the anode and cathode at a rate greater than 0.5 mA/cm$^2$ at room temperature.

The battery wherein a diffusing ion is cycled between the anode and cathode at a rate greater than 1.0 mA/cm$^2$ at room temperature.

The battery wherein a diffusing ion is cycled between the anode and cathode for greater than 150 cycles.

The battery wherein a diffusing ion is cycled between the anode and cathode at a rate greater than 3.0 mAh/cm$^2$ at room temperature for greater than ten cycles.

The battery wherein a diffusing ion is cycled between the anode and cathode at a rate greater than 18.0 mAh/cm$^2$. The battery wherein a diffusing ion is cycled between the anode and cathode at a rate greater than 0.25 mAh/cm$^2$ at room temperature for greater than 150 cycles.

The battery wherein the cycling efficiency is greater than 99%.

The battery wherein the second electrolyte comprises the solid ionically conductive polymer electrolyte and is formed into a film, and attached to a cathode.

The battery wherein an electrolyte layer is formed into a film, and attached to a anode. The bipolar battery wherein the charged voltage of the battery is greater than 8 volts. The bipolar battery of claim 1, wherein the charged voltage of the battery is greater than 12 volts.

The bipolar battery of claim 1, wherein the charged voltage of the battery is greater than 20 volts.

The bipolar battery of claim 1, having a second cycle cycling efficiency greater than 99%. The bipolar battery of claim 1, wherein the voltage of the battery is greater than 12 volts, and wherein the battery provides an amperage rate greater than 3 mA/cm$^2$.

In an aspect, a method of manufacturing a bipolar battery comprising the steps of: mixing a polymer with an electron acceptor to create a first mixture; heating the first mixture to form a reaction product comprising a plurality charge transfer complexes; mixing at least one ionic compound with the reaction product to form a solid ionically conductive polymer material.

Further aspects of the method of manufacturing a battery can include one or more of the following:

The method further comprising including mixing a first electrochemically active material with the solid ionically conductive polymer material to form a cathode.

The method wherein the cathode forming step further includes mixing an electrically conductive material with the first electrochemically active material and the solid ionically conductive polymer material.

The method wherein the cathode forming step further comprising a calendaring step wherein the density of the cathode is increased.

The method wherein the solid ionically conductive polymer material is formed into a film to form a solid ionically conductive polymer electrolyte.

The method wherein the dopant is a quinone.

The method wherein the polymer is PPS, a conjugated polymer or a liquid crystal polymer.

The method wherein the ionic compound is a salt, hydroxide, oxide or other material containing lithium.

The method wherein the ionic compound comprises lithium oxide, lithium hydroxide, lithium nitrate, lithium bis-trifluoromethanesulfonimide, Lithium bis(fluorosulfonyl)imide, Lithium bis(oxalato)borate, lithium trifluoromethane sulfonate), lithium hexafluorophosphate, lithium tetrafluoroborate, or lithium hexafluoroarsenate, and combinations thereof.

The method wherein in the heating step the first mixture is heated to a temperature between 250 and 450 deg. C.

The method wherein the cathode is positioned adjacent a first side of a electrically conducting bipolar current collector, and an anode is positioned adjacent a second side of the bipolar current collector to form a bipolar electrode assembly.

The method wherein the solid ionically conductive polymer material is formed into a film to form two portions of solid ionically conductive polymer electrolyte, and located on each side of a bipolar electrode assembly.

The method further comprising an enclosure, and further comprising an assembly step wherein the bipolar electrode is positioned between the two current collectors and the to form a battery assembly, and the battery assembly is placed within the enclosure.

The method in the bipolar electrode assembly step, the film is attached to the anode, the cathode or both the anode and the cathode.

The method wherein in the attaching step the film is coextruded with either the anode, cathode or both the anode and the cathode.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
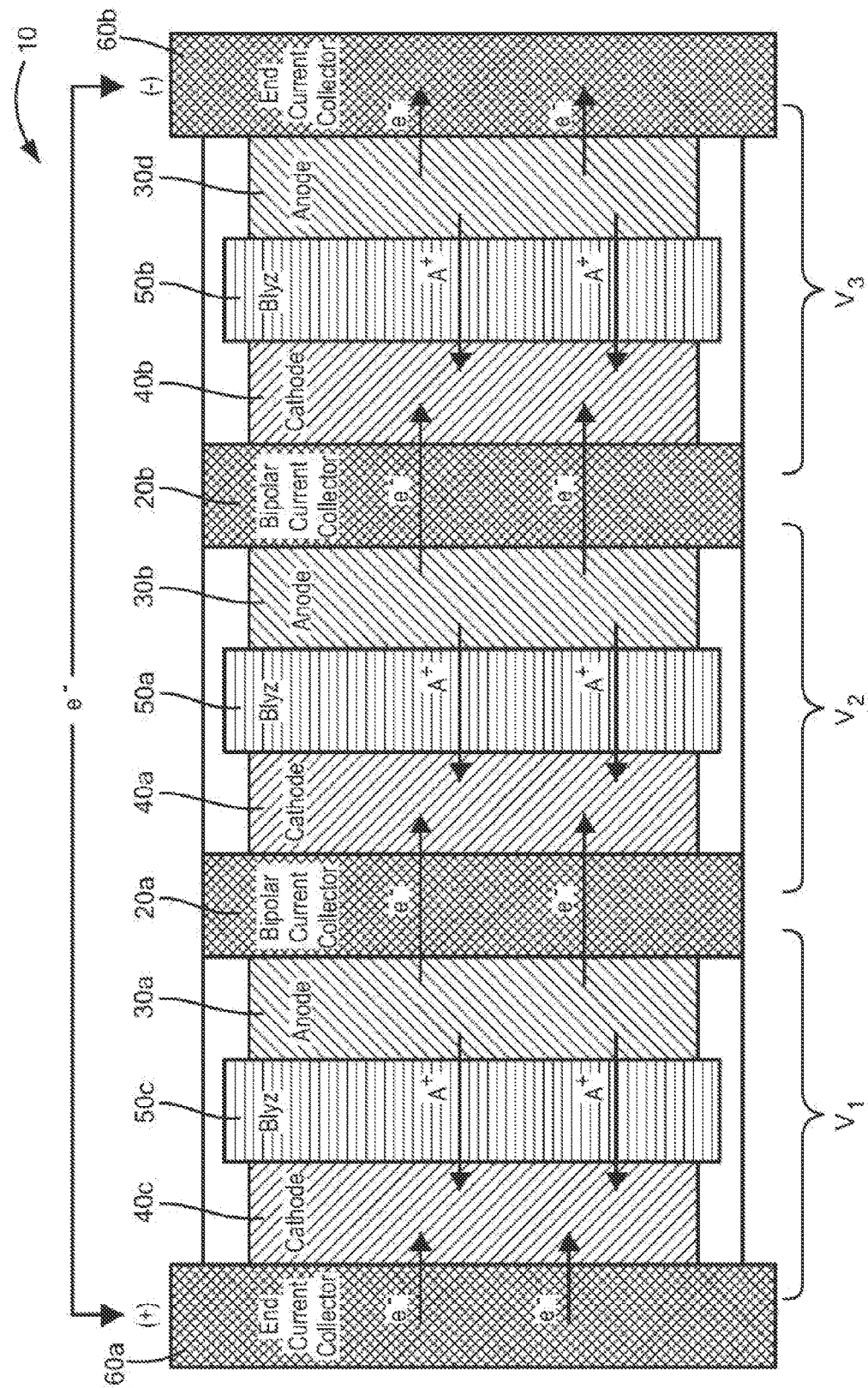
FIG. 1 is a representation of a bipolar battery cross section.

This application claims the benefit of U.S. Provisional Patent Application No. 62/170,959 filed Jun. 4, 2015; hereby incorporated by reference; and also incorporates by reference U.S. Provisional Patent Application No. 62/158,841 filed May 8, 2015, U.S. patent application Ser. No. 14/559,430 filed Dec. 3, 2014; U.S. Provisional Patent Application No. 61/911,049 filed Dec. 3, 2013; U.S. patent application Ser. No. 13/861,170 filed Apr. 11, 2013; and U.S. Provisional Patent Application No. 61/622,705 filed Apr. 11, 2012.

A bipolar battery is described which is enabled to operate efficiently at a high voltage by a solid ionically conductive polymer material.

The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material.

Thermoplastic is a characteristic of a plastic material or polymer to become pliable or moldable above a specific temperature often around or at its melting temperature and to solidify upon cooling.

A "Solid" is characterized by the ability to keep its shape over an indefinitely long period, and is distinguished and different from a material in a liquid phase. The atomic structure of solids can be either crystalline or amorphous. Solids can be mixed with or be components in composite structures. However, for purposes of this application and its claims, a solid material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes in that they rely on a liquid phase for their ionic conductivity. A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is typically no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1 \times 10^{-14}$ m$^2$/s and preferably at least $1 \times 10^{-13}$ m$^2$/s, which both communicate an ion is mobile in a material.

A solid polymer ionically conducting material is a solid that comprises a polymer and that conducts ions as will be further described.

An aspect includes a method of synthesizing a solid ionically conductive polymer material from at least three distinct components: a polymer, a dopant and an ionic compound.

The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity). Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesis the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conductive polymer material in a single step. However, this heating step can be done when in a separate step from any mixing or can completed while mixing is being done. The heating step can be performed regardless of the form of the mixture (e.g. film, particulate, etc.) In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color it is believed that this color change occurs as charge transfer complexes are being formed, and can occur gradually or quickly depending on the synthesis method. An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete. Additional heating past synthesis (color change) does not appear to negatively affect the material.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of film containing the base polymer and ionic compound and other doping methods known to those skilled in the art Upon doping the solid polymer material becomes ionically conductive, and it is believed that he doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conductive polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{-20}$ S cm$^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Copolymers including monomers of the listed polymers and mixtures of these polymers may also be used. For example, copolymers of p-hydroxybenzoic acid can be appropriate liquid crystal polymer base polymers.

Table 1 details non-limiting examples of reactant polymers useful in the synthesis of the solid ionically conductive polymer material along with monomer structure and some physical property information which should be considered also non-limiting as polymers can take multiple forms which can affect their physical properties.

TABLE 1

| Polymer | Monomer Structure | Melting Pt. (C) | MW |
|---|---|---|---|
| PPS polyphenylene sulfide | | 285 | 109 |
| PPO Poly(p-phenylene oxide) | | 262 | 92 |
| PEEK Polyether ether ketone | | 335 | 288 |
| PPA Polyphthalamide | | 312 | |
| Polypyrrole | | | |
| Polyaniline Poly-Phenylamine $[C_6H_4NH]_n$ | | 385 | 442 |
| Polysulfone | | | 240 |
| Xydar (LCP) | | | |

TABLE 1-continued

| Polymer | Monomer Structure | Melting Pt. (C) | MW |
|---|---|---|---|
| Vectran Polyparaphenylene [—CO—$C_6H_4$—CO—NH—$C_6H_4$—NH—]$_n$ | | | |
| Polyvinylidene fluoride (PVDF) | | 177 | |
| Polyacrylonitrile (PAN) | | 300 | |
| Polytetrafluoroethylene (PTFE) | | 327 | |
| Polyethylene (PE) | | 115-135 | |

Dopants that are useful as reactants in the synthesis of the solid ionically conductive polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur tri oxide ("$SO_3$"), ozone (tri oxygen or O3), oxygen ($O_2$, including air), transition metal oxides including manganese dioxide ("$MnO_2$"), or any suitable electron acceptor, etc. and combinations thereof. Dopants that are temperature stable at the temperatures of the synthesis heating step are useful, and quinones and other dopants which are both temperature stable and strong oxidizers quinones are very useful. Table 2 provides a non-limiting listing of dopants, along with their chemical diagrams.

TABLE 2

| Dopant | Formula | Structure |
|---|---|---|
| 2,3-Dichloro-5,6-dicyano-1,4-benzoquinone (DDQ) | $C_6Cl_2(CN)_2O_2$ | |
| Tetrachloro-1,4-benzoquinone (chloranil) | $C_6Cl_4O_2$ | |

TABLE 2-continued

| Dopant | Formula | Structure |
|---|---|---|
| Tetracyanoethylene (TCNE) | $C_6N_4$ | |
| Sulfur Trioxide | $SO_3$ | |
| Ozone | $O_3$ | |
| Oxygen | $O_2$ | |
| Transition Metal Oxides | $M_xO_y$ (M = Transition Metal, x and y are equal to or greater than 1) | |

Ionic compounds that are useful as reactants in the synthesis of the solid ionically conductive polymer material are compounds that release desired ions during the synthesis of the solid ionically conductive polymer material. The ionic compound is distinct from the dopant in that both an ionic compound and a dopant are required. The particular ionic compound included in the synthesis depends on the utility desired for the material. For example, in an aspect where it would be desired to have a lithium cation which is ionically mobile in the solid ionically conductive polymer material, a lithium hydroxide, or a lithium oxide convertible to a lithium and hydroxide ion would be appropriate. As would be any lithium containing compound that releases both a lithium cathode and a diffusing anion during synthesis. A non-limiting group of such lithium ionic compounds includes those used as lithium salts in organic solvents. Non-limiting examples include $Li_2O$, UiH, $LiNO_3$, LiTFSI (lithium bis-trifluoromnethanesulfonimide), LiFSI (Lithium bis(fluoro-sulfonyl)imide), Lithium bis(oxalato)borate ($LiB(C_2O_4)_2$ "LiBOB"), lithium triflate $LiCF_3O_3S$ (lithium trifluoromethane sulfonate), LiPF6 (lithium hexafluorophosphate), LiBF4 (lithium tetrafluoroborate), LiAsF6 (lithium hexafluoroarsenate) and other lithium salts and combinations thereof. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are useful, and purities greater than 98% are more useful with even higher purities, e.g. LiOH: 99.6%, DDQ: >98%, and Chloranil: >99% also useful.

To further describe the utility of the solid ionically conductive polymer material and the versatility of the above described method of the synthesis of the solid ionically conductive polymer material, use of the solid ionically conductive polymer material in certain aspects of bipolar electrochemical applications are described:

The technical benefits of bipolar battery design cross several areas, including flexibility in the overall voltage provided by the battery, increased energy density, decreased internal impedance, and in the case of the Ionic bipolar battery—a high voltage cell with very high safety. The voltage flexibility enabled by the bipolar design is important to the market application of the cell, where desirable voltage windows (such as 4 V lithium ion, 12 V for automotive, etc.) can be matched, and is discussed below. However, a strong benefit also exists in the flexibility that this design gives to considering electrode couples which would normally be discounted because of lower voltage. The lower voltage of these electrode couples can be offset by the bipolar design, stacking bipolar cell units and creating a higher overall cell voltage. The potential benefits of utilizing lower voltage electrode materials can include low cost, high capacity, improved stability and cycle life, inherent safety and environmentally benign material properties. Thus, the bipolar battery design not only yields greater battery voltage flexibility, but also opens a much greater array of material choices to improve manufacturing.

Another aspect of the bipolar battery is the combination of a high voltage system with a fundamentally safe battery chemistry. Safety testing of the bipolar battery has demonstrated low temperatures during direct short circuits and abusive puncture tests. This shows that high voltage batteries, which can be used in place of traditional liquid lithium ion batteries, can also be very safe and benign toward abusive conditions. This provides a significant benefit to the end user of the battery.

The benefits of bipolar battery construction—increased energy, decreased impedance, improved safety, and voltage flexibility—provide direct advantages over existing battery solutions in a range of market applications. Voltage flexibility may be one of the most important of these advantages Currently, battery chemistry selection and design choices of the end application are interlinked decisions—the voltage of the chemistry affects the end application's design, and the application's voltage requirements narrow the list of potential chemistry choices. Many consumer electronics, for example, are designed to run on 4 volt lithium ion batteries, making less expensive and lower voltage chemistries such as alkaline and nickel metal hydride an undesirable fit. Electric vehicles, on the other hand, are designed to run on very high voltage systems, necessitating complicated and bulky battery packs with multiple modules in series to increase the voltage.

Bipolar batteries provide much more voltage flexibility than existing solutions. By allowing low voltage chemistries to compete with more expensive lithium ion technologies and by minimizing packaging in high voltage batteries for electric vehicle and other applications, bipolar batteries have cost and performance advantages over existing technologies. A four-layer bipolar nickel metal hydride battery containing the solid ionically conductive polymer material, for example, is 4.8 volts and could be used in consumer electronics applications where battery cost is a driver. Furthermore, for high voltage applications, a ten-layer lithium ion battery with solid ionically conductive polymer material has an electric potential of nearly 40 volts with significantly less packaging than ten four-volt lithium ion cells connected in series.

Bipolar batteries seek to internally connect multiple electrochemical cells in series. In this configuration, the cathode of the first cell shares a current collector with the anode of the next cell to create a series connection. Electrons flow directly through this current collector from the anode to the cathode. At the last anode in the series, electrons flow out into the battery's end current collector, which is connected to an external terminal. This configuration results in a battery with a total voltage that is the sum of the individual cell voltages, enabling much more voltage flexibility than with traditional cell layouts. FIG. 1 shows this configuration for a three-cell bipolar battery.

Referring to FIG. 1, there is shown a pictorial representation of a bipolar battery cross section. The bipolar battery 10 includes a plurality of both bipolar electrodes and anode-cathode couples or sub-stack assemblies, with the latter being labeled by V1, V2 and V3 for the sub-voltages these couples provide. Each bipolar electrode comprises a bipolar current collector 20a and 20b. Adjacent each bipolar current collector is both an anode 30a and 30b, and a cathode 40a and 40b. The bipolar electrodes are separated from each other by a layer of the solid ionically conductive polymer material electrolyte 50a. Terminal electrodes: anode 30d, and cathode 40c are located in coupled opposition to the cathode 40b and anode 30a respectively and separated by the interposed electrolyte comprising the solid ionically conductive polymer electrolyte 50b and 50c respectively. As each terminal electrode is positioned at a battery end, an end current collector 60a and 60b are located in electrical connection with each terminal electrode. The end current collectors can act a battery terminals or in an aspect can be in electrical connection with battery terminals. The battery terminals can be connected to either an open circuit or a load wherein the battery will provide either an open circuit voltage e- or an electron flow to the load.

The bipolar battery includes at least one bipolar electrode, and in FIG. 1 there is shown two bipolar electrodes positioned adjacent each other in an aspect where there is a plurality of bipolar electrodes, each would be similarly positioned with a layer of electrolyte therebetween. Each bipolar electrode including a positive electrode having a first electrochemically active material on one side of an electrically conducting sheet and a negative electrode having a second electrochemically active material on the other side of the sheet.

The number of electrolyte layers, each comprising a solid ionically conductive polymer material depends on the number of bipolar electrodes, and a plurality plus one of electrolyte layers would be required to accommodate a plurality of bipolar electrodes. Each electrolyte layer, containing the solid ionically conductive polymer material enables significant ionic conductivity at room temperature which enables the bipolar battery to both be a stable system and to perform at high drain rates.

Each terminal electrode, i.e. terminal negative electrode (anode) 30d and the terminal positive electrode (cathode) 40c, is not a component of a bipolar electrode but form a sub stack with an opposed electrode that is a bipolar electrode component. The terminal negative electrode is located opposed to and in electrochemically coupled relation to a positive electrode located on a first adjacent bipolar electrode with an electrolyte layer interposed therebetween. Similarly, the terminal positive electrode is located opposed to a negative electrode layer on a second adjacent bipolar electrode with an electrolyte layer interposed therebetween.

In the bipolar battery 10, each positive electrode 40a, 40b, 40c and the adjacent anode 30a, 30b, 30d comprise a sub-stack which also includes an electrolyte layer. For example, components 40b, 50b and 30d comprise a first sub-stack which generates a voltage V3. Each sub-stack is separated from an adjacent sub-stack by an electrically conductive sheet, which conducts the electrons from each sub-stack in a series to produce an aggregate battery voltage, as it is in electrical communication with each sub-stack in the battery.

The sub-stack comprising the electrolyte layer 50a positioned between anode 30b and cathode 40a, and generates voltage V2. The second sub-stack is positioned adjacent and in electrical but not ionic communication with the first sub-stack via the bipolar current collector 20b, and also in electrical connection with a third sub-stack via bipolar current collector 20a which is positioned adjacent the second sub-stack and bounds the second sub-stack on one end with the bipolar current collector 20b positioned opposed from current collector layer 20a and bounding the opposite end.

The voltage of each sub-stack depends on the relative electropotential of the included electrodes. The sub-stack voltage can be is equal to or less than 3 volts or be very high e.g. greater than 4.2 volts, or greater than 5 volts. The electropotential of the electrodes depends on the electropotential of the included electrochemically active materials. Anode electrodes can include zinc, aluminum, lithium, an intercalation material and many other electrochemically active materials. Cathode electrodes can include manganese dioxide, sulfur, an intercalation and many other electrochemically active materials.

The bipolar current collectors 20a and 20b are used for both the cathode 40a and 40b and anode 30a and 30b of adjacent bipolar cell units. The bipolar battery 10 uses one less current collector for each electrochemical pair, which reduces the volume and weight occupied by inactive components. Depending on the number of bipolar cell units in the battery, which can be considerable in large high-voltage batteries, the number of current collectors eliminated from the design can be substantial. Furthermore, since the bipolar current collector transfers electrons directly between the cathode and anode, across the entire face of the electrodes, the thickness of the current collector can be very thin, even for the highest rate cell designs. Thus, significant increases in volumetric and gravimetric energy densities result from the bipolar cell construction, where less current collectors are needed, and thin current collectors can be utilized. The true energy density improvement will depend on the specific design used in the system, but it is estimated that the reduction in the number of current collectors alone can increase the energy density by 10 to 15%. The utilization of thin current collectors in a high rate design, along with the elimination in external cell packaging (battery case and terminals) for multiple cells connected in series is estimated to provide another 10 to 25% increase in energy density, depending again on the size and voltage of the bipolar cell in question.

Bipolar batteries are especially useful for high rate applications, because the bipolar design provides lower internal impedance compared to a traditional battery design. This lower internal impedance results in a battery which is able to be charged and discharged at a faster rate, and provide higher currents for demanding high power applications. The reason that the bipolar battery has inherently lower impedance is due to direct current flow across the entire face of the electrodes between bipolar cell units. In a traditional cell, current flows along the electrode from the electrode tab, down to the furthest point. In a bipolar cell, the current can directly transfer between the cathode and anode throughout the entire area of the bipolar current collector, travelling a distance of microns rather than tens of centimeters, which corresponds to the thickness of the bipolar current collector. This provides a significant benefit in lowering the impedance and DC resistance (Rdc) of the cell, and results in the cell providing a higher voltage when placed under load. The bipolar current collector 20a and 20b can be copper, aluminum, stainless steel or any highly electrically conductive material that is thin and shaped to be positioned between the anode and cathodes.

The end current collectors 60a and 60b can be the same material or an identical component as the bipolar current collectors. In an aspect the end current collectors can be electrically conducting tabs which are affixed to the end electrodes to conduct current in and out of the battery from the respective terminals Unlike the bipolar current collectors, which extend across the entire adjacent surface of their electrodes, the end current collectors need not act to prevent the proximity of the bipolar electrode anodes and cathode as there is no electrode couple.

Each anode 30a, 30b and 30d can comprise an electrochemically active material appropriate for the desired electrochemical system. The anode-cathode couple is not restrictive as the bipolar battery 10 can comprise any electrochemical couple which includes solid materials as the electrochemically active couple (anode and cathode). Although lithium batteries are described, lithium batteries are an aspect and not the sole electrochemical system. In the aspect where the electrochemical couple comprises lithium as the electrochemically active material of the anode, the anode can comprise lithium metal in an aspect, or a lithium intercalation material in another aspect.

In the aspect when an anode intercalation material is used as the anode electrochemically active material, useful anode materials include typical anode intercalation materials comprising: lithium titanium oxide (LTO), Silicon (Si), germanium (Ge), and tin (Sn) anodes doped and undoped; and other elements, such as antimony (Sb), lead (Pb), Cobalt (Co), Iron (Fe), Titanium (Ti), Nickel (Ni), magnesium (Mg), aluminum (Al), gallium (Ga), Germanium (Ge), phosphorus (P), arsenic (As), bismuth (Bi), and zinc (Zn) doped and undoped; oxides, nitrides, phosphides, and hydrides of the foregoing; and carbons (C) including nanostructured carbon, graphite, graphene and other materials including carbon, and mixtures thereof in this aspect the anode intercalation material can be mixed with and dispersed within the solid ionically conducting polymer material such that the solid ionically conducting polymer material can act to ionically conduct the lithium ions to and from the intercalation material during both intercalation and deintercalation (or lithiation/delithiation). Electrically conductive additives can be additionally added to such an intercalation anode to enable electrons from flow from the electrochemically active material to the adjacent current collector.

In the aspect when lithium metal is used, the lithium can be added with the cathode material, added to the anode as lithium foil, dispersed in the solid ionically conducting polymer material, or added to both battery components. The solid ionically conductive polymer electrolyte acts to transport the lithium metal to and from the anode and therefore must be positioned within the battery so it is enabled to do so. Thus the solid ionically conductive polymer electrolyte can be positioned as a film layer, or any other shape which enables the solid ionically conductive polymer electrolyte to perform its lithium ion conduction. The thickness of the solid ionically conductive polymer electrolyte can be in a desired range of uniform thicknesses such as 200 to 25 micrometers or thinner. To aid in extrusion of the solid ionically conductive polymer electrolyte, a rheological or extrusion aid can be added such as EPDM (ethylene propylene diene monomer) in amounts necessary to affect the desired extrusion properties.

Each cathode 40a, 40b and 40c can comprise an electrochemically active material appropriate for the desired electrochemical system and the anode-cathode couple as the bipolar battery 10 can comprise any electrochemical couple which includes solid materials as the electrochemically active couple (anode and cathode). Although lithium batteries are described, lithium batteries are an aspect and not the sole electrochemical system. Typical electrochemically active cathode compounds which can be used include but are not limited to: NCA—Lithium Nickel Cobalt Aluminum Oxide ($LiNiCoAlO_2$), NCM (NMC)—Lithium Nickel Cobalt Manganese Oxide ($LiNiCoMnO_2$); LFP—Lithium Iron Phosphate ($LiFePO_4$), LMO—Lithium Manganese Oxide ($LiMn_2O_4$); LCO—Lithium Cobalt Oxide ($LiCoO_2$); lithium oxides tor phosphates that contain nickel, cobalt or manganese, and $LiTiS_2$, $LiNiO2$, and other layered materials, other spinels, other olivines and tavorites, and combinations thereof. In an aspect, the electrochemically active cathode compounds can be an intercalation material or a cathode material that reacts with the lithium or other electrochemically active cathode material in a solid state redox or conversion reaction. Such conversion cathode materials include: metal halides including but not limited to metal fluorides such as $FeF_2$, $BiF_3$, $CuF_2$, and $NiF_2$, and metal chlorides including but not limited to $FeCl_3$, $FeCl_2$, $CoCl_2$, $NiCl_2$, $CuCl_2$, and AgCl; Sulfur (S); Selenium (Se); Tellerium (Te); Iodine (I); Oxygen (O); and related materials such as but not limited to pyrite ($FeS_2$) and $Li_2S$. As the solid ionically conductive polymer electrolyte is stable at high voltages (exceeding 5.0V relative the anode electrochemically active material), an aspect is to increase the energy density by enabling as high a voltage battery as possible, therefore high voltage cathode compounds are preferred in this aspect. Certain NCM or NMC material can provide such high voltages with high concentrations of the nickel atom. In an aspect, NCMs that have an atomic percentage of nickel which is greater than that of cobalt or manganese, such as $NCM_{7i2}$, $NCM_{721}$, $NCM_8n$, $NCM_{532}$, and $NCM_{523}$, are useful to provide a higher voltage relative the anode electrochemically active material.

The cathode, like the anode, can be dispersed within the solid ionically conductive polymer material, by being mixed with it and an electrically conductive material such as carbon or graphite. The cathode can be formed onto the bipolar current collector or formed as an independent structure and place adjacent the bipolar current collector.

The aspects of the bipolar battery, its construction and its function are described in the following examples.

EXAMPLES

The battery article and its components are described here, and ways to make and use them are illustrated in the following examples.

Example 1

PPS and chloranil powder are mixed in a 4.2:1 molar ratio (base polymer monomer to dopant ratio greater than 1:1). The mixture is then heated in argon or air at a temperature up to 350° C. for about twenty-four (24) hours at atmospheric pressure. A color change is observed confirming the creation of charge transfer complexes in the polymer-dopant reaction mixture. The reaction mixture is then reground to a small average particle size between 1-40 micrometers. LiTFSI powder (12 wt. % of total mixture) is then mixed with the reaction mixture to create the synthesized solid, ionically conducting polymer material. The solid, ionically conducting polymer material which is used as a solid ionically conductive polymer electrolyte in this aspect is referred to as a solid polymer electrolyte when thus used.

The solid ionically conductive polymer electrolyte can be used in multiple locations in a battery, including in an electrode, or as a standalone dielectric, non-electrochemically active electrolyte interposed between electrodes. When so used, the solid ionically conductive polymer electrolyte can be the same material in all battery application, and in the aspect of a lithium battery if the ionic mobility of lithium is maximized, this property and attribute of the solid ionically conductive polymer electrolyte allows the solid ionically conductive polymer electrolyte to function well in an anode, cathode and as a standalone dielectric, non-electrochemically active electrolyte interposed between anode and cathode electrodes. However, in an aspect, the solid ionically conductive polymer electrolyte can vary so as to accommodate different properties that may be desired in an application. In a non-limiting example, an electronically conductive material could be added to the solid ionically conductive polymer electrolyte or integrated into the solid ionically conductive polymer electrolyte during its synthesis thus increasing the electrical conductivity of the solid ionically conductive polymer electrolyte and making it suitable for use in an electrode and reducing and or eliminating the need for additional electrical conductive additives in such an electrode. If so used, such a formulation would not be appropriate for use as a standalone dielectric, non-electrochemically active electrolyte interposed between anode and cathode electrodes as it is electrically conductive and would act to short the battery.

Further, use of the solid ionically conductive polymer electrolyte in an anode, cathode and as a standalone dielectric, non-electrochemically active electrolyte interposed between anode and cathode electrodes enables a battery designer to take advantage of the thermoplastic nature of the solid ionically conductive polymer electrolyte. The standalone dielectric, non-electrochemically active electrolyte can be thermoformed onto the anode or cathode by being heated and fixed thereto, such as in a lamination process, or by being co-extruded and thus formed together with the electrode. In an aspect all three battery components include the solid ionically conductive polymer electrolyte and are thermoformed together or coextruded to form a battery.

Electronic conductivity of the synthesized material is measured using potentiostatic method between blocking electrodes, and was determined to be $6.5 \times 10^{-9}$ S/cm or lower (less conductive) than $1 \times 10^{-8}$ S/cm.

Diffusivity measurements were conducted on the synthesized material. PGSE-MR measurements were made using a Varian-S Direct Drive 300 (7.1 T) spectrometer. Magic angle spinning technique was used to average out chemical shift anisotropy and dipolar interaction Pulsed gradient spin stimulated echo pulse sequence was used for the self-diffusion (diffusivity) measurements. The measurements of the self-diffusion coefficients for the cation and anion in each material sample were made using 1H and $^7$Li nuclei, respectively. The material cation diffusivity D ($^7$Li) of $0.23 \times 10^{-9}$ m²/s at room temperature, and the anion diffusivity D ($^1$H) of was $0.45 \times 10^{-9}$ m²/s at room temperature.

In order to determine the degree of ion association which would decrease the conductivity of the material, the conductivity of the material is calculated via the Nernst-Einstein equation, using the measured diffusion measurements, it was determined the associated calculated conductivity to be much greater than the measured conductivity. The difference was on average at least an order of magnitude (or 10×). Therefore, it is believed that conductivity can be improved by improving ion dissociation, and the calculated conductivities can be considered within the range of conductivity.

The cation transference number can be estimated via equation (1) from the diffusion coefficient data as: $t+ \sim D+/(D++D-)$ (1) where D+ and D− refer to the diffusion coefficients of the Li cation and TFSI anion, respectively. From the above data, one obtains a t+ value of about 0.7 in the solid ionically conductive polymer material. This property of high cation transference number has important implications to battery performance. Ideally one would prefer a t+ value of 1.0, meaning that the Li ions carry all the electric current. Anion mobility results in electrode polarization effects which can limit battery performance. The calculated transference number of 0.7 is not believed to have been observed in any liquid or PEO based electrolyte. Although ion association may affect the calculation, electrochemical results confirm the transference number range of between 0.65 and 0.75.

It is believed that the t+ is dependent on anion diffusion as lithium cation diffusion is high. As the cation diffusion is greater than the corresponding anion diffusion the cation transference number is always above 0.5, and as the anion is mobile the cation transference number must also be less than 1.0. It is believed that a survey of lithium salts as ionic compounds would produce this range of cation transference numbers greater than 0.5 and less than 1.0. As a comparative example, some ceramics have been reported to have high diffusion numbers, however such ceramics only transport a single ion, therefore the cation transference number reduces to 1.0 as the D− is zero.

Example 2

Additional solid ionically conductive polymer materials are listing in Table 3, along with the material synthesized and described in Example 1 (PPS-Chloranil-LiTFSI), which were prepared using the synthesis method of Example 1, along with their reactants and associated ionic conductivity (EIS method) at room temperature.

| Polymer (base) | Dopant | Ionic Compound (Wt %) | | Ionic Conductivity (S/cm) |
|---|---|---|---|---|
| PPS | Chloranil | LiTFSI (12) | | 6.0E−04 |
| PPS | Chloranil | LiTFSI (4) | LiBOB(1) | 2.2E−04 |

-continued

| Polymer (base) | Dopant | Ionic Compound (Wt %) | | | Ionic Conductivity (S/cm) |
|---|---|---|---|---|---|
| PPS | Chloranil | LiTFSI (10) | | LiBOB(1) | 7.3E−04 |
| PPS | Chloranil | LiTFSI (10) | | LiBOB(1) | 5.7E−04 |
| PPS | Chloranil | | LiFSI (10) | LiBOB(1) | 8.8E−04 |
| PPS | Chloranil | LiTFSI (5) | LiFSI (5) | LiBOB(1) | 1.3E−03 |

Various physical properties of the solid ionically conductive polymer materials are measured and it is determined that the solid ionically conductive polymer materials: electronic conductivity of the solid ionically conductive polymer material is less than $1 \times 10^{-8}$ S/cm at room temperature; can be molded to thicknesses from 200 micrometers down to 20 micrometers; possesses significant ionic mobility to very low temperatures. e.g. −40° C., and have ionic conductivities at room temperature greater than 1.0E-05 S/cm, 1.0E−04 S/cm, and 1.0E−03 S/cm, and these ionic conductivities include lithium as one of the mobile ions being conducted through the solid ionically conductive polymer material.

Example 3

The solid ionically conductive polymer electrolyte of Example 2, specifically PPS/Chloranil/LiTFSI—LiFSI—LiBOB, was used to make a bipolar secondary lithium cell. The cell comprised a lithium metal anode, the solid ionically conductive polymer electrolyte was used as an electrolyte layer and interposed between the anode and a slurry cathode. The slurry cathode also comprised the solid ionically conductive polymer electrolyte and the cathode is manufactured using a stepwise process. The process initially includes a polyvinylidene difluoride (PVDF) binder in a solvent such as N-Methyl-2-pyrrolidone (MP) or Dimethylacetamide (DMA). Electrically conductive carbon and graphite and the solid ionically conductive polymer electrolyte are then added in a first mixing step in which the carbon and solid ionically conductive polymer electrolyte remain stable and insoluble in the binder solvent. This first mixture is then mixed in a second mixing step with a electrochemically active cathode material such as Lithium cobalt oxide (LiCoO$_2$) ("LCO") to create a slurry mix which is then coated onto a cathode collector. After a drying step in which the binder solvent is driven out of the cathode, the cathode is calendared to create a high density cathode.

Table 4 details composition ranges for each of the cathode components included in the described slurry cathode process.

TABLE 4

| Cathode Component | Wt. % |
|---|---|
| Electrochemically Active Material | 70-90 |
| Solid ionically conductive polymer electrolyte | 4-15 |
| Electrically conductive carbon | 1-5 |
| Electrically conductive graphite | 1-5 |
| Binder | 3-5 |

The high density cathode is about 15 to 115 micrometers in thickness, and has a cathode coating density in the range of 1.2 to 3.6 g/cc.

Example 4

Bipolar batteries were assembled using Li metal anodes. Cathodes were prepared incorporating electrochemically active material listed in Table 5, and according to the method described in Example 3, and the lithium metal anode is positioned opposite the cathode on the current collector to create a bipolar electrode including the solid ionically conductive polymer material. A film of the solid ionically conductive polymer material is located between the anodes and cathodes layers or between the bipolar electrodes. Three layers of bipolar electrodes were used in the battery giving a total cell voltage of listed in Table 5. Since the solid ionically conductive polymer material was used in this battery, no attempt was made to seal between the bipolar electrodes; and all of the layers were stacked directly adjacent each other. This is in contrast to a liquid electrolyte system, where great care and elaborate cell design is needed to ensure that the liquid electrolyte is sealed and does not cross over from one bipolar electrode to another. Conductive tabs are affixed to the terminal cathode and anode layers.

After assembling the bipolar battery using the described electrodes and solid ionically conductive polymer material, the battery was vacuum sealed in aluminum laminate pouch material in a manner so the conductive tabs protrude from the pouch to act as terminal leads for the bipolar pouch cell.

TABLE 5

| Cell | Anode Material | Cathode Material | No. of Cathodes | Initial OCV (V) |
|---|---|---|---|---|
| 160217-9-5 | Lithium Metal | NCM | 2 | 6.80 |
| 160219-11-3 | Lithium Metal | NCM | 3 | 10.22 |
| 160226-13-1 | Lithium Metal | LCO | 3 | 9.65 |
| 160228-16-1 | Lithium Metal | LCO | 3 | 9.44 |
| 160325-22-4 | Lithium Metal | LCO | 3 | 9.75 |

Example 5

Figure 2A:
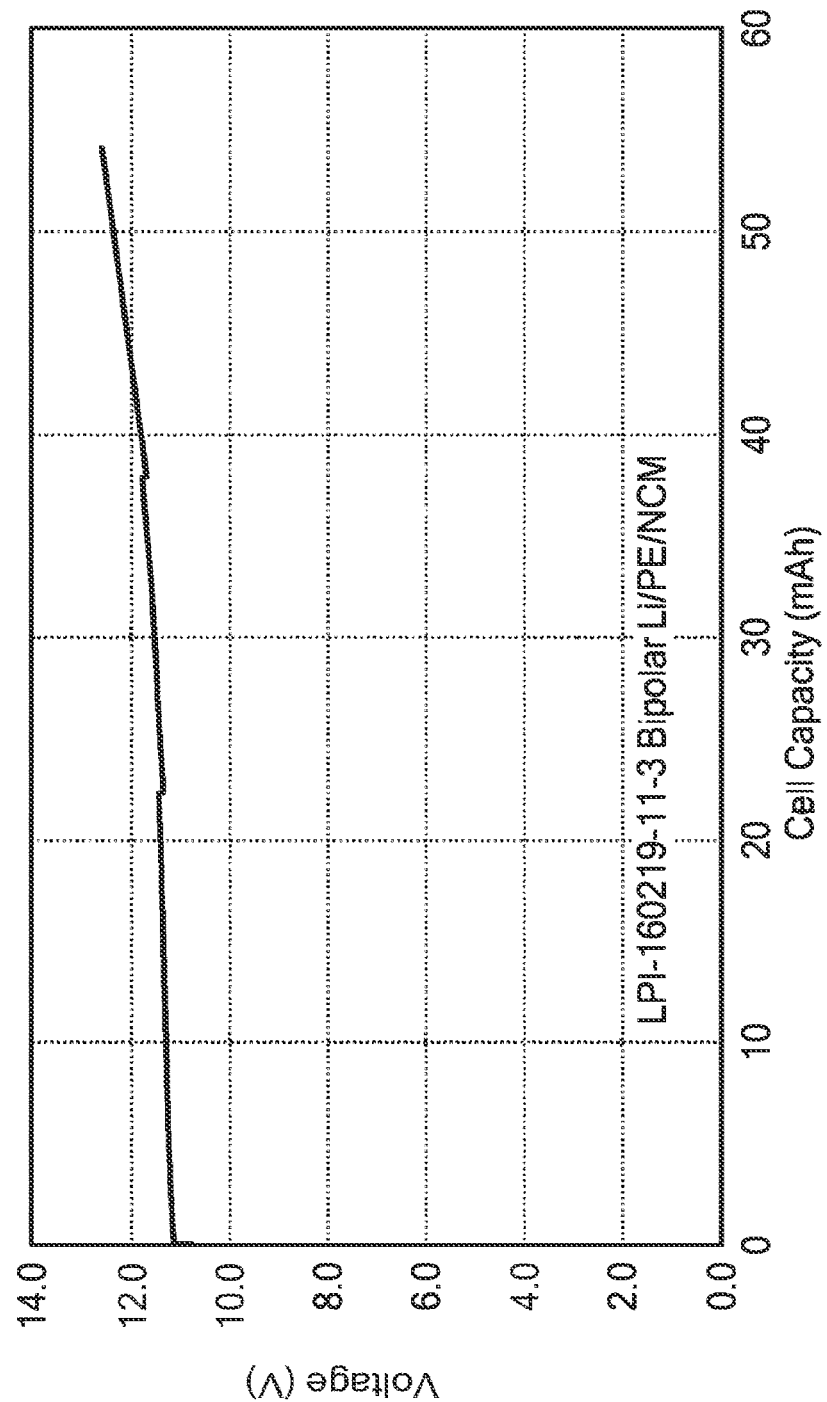
FIG. 2A is a plot of a capacity-voltage (CV) charge curve of a bipolar battery described in Example 5.
Figure 2B:
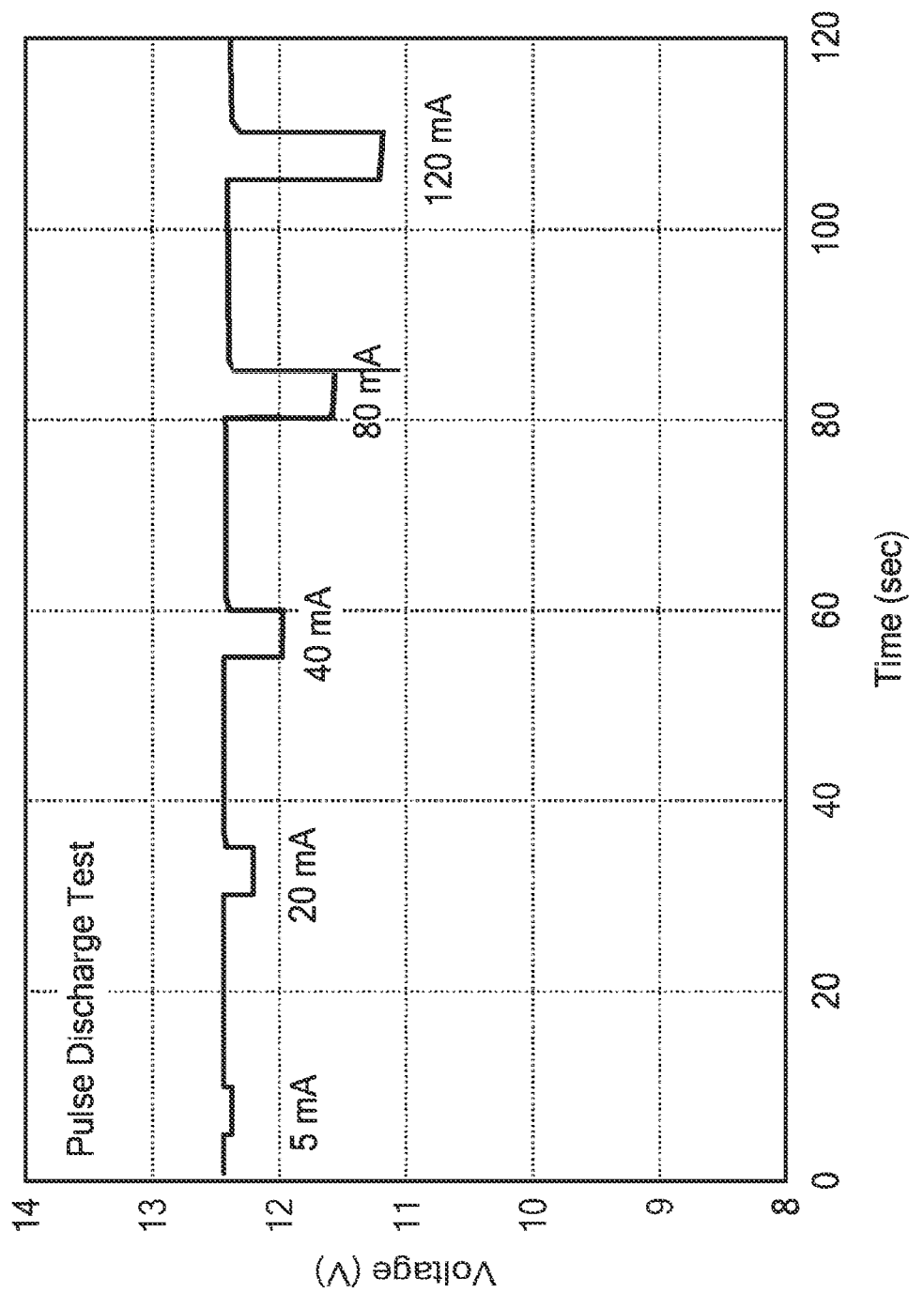
FIG. 2B is a plot of a capacity-voltage (CV) pulse discharge curve of a bipolar battery described in Example 5.

The bipolar pouch cells (batteries) from Example 4 are tested to determine voltage stability, performance, cycling efficiency and shelf life. Referring to FIG. 2A and FIG. 2B, a bipolar pouch cells comprising a NCM cathode was tested for stability. FIG. 2A is a charge curve which displays stable voltage for the first cycle of the cell. FIG. 2B shows the high rate pulse discharge of this same bipolar cell, and demonstrates the bipolar cell is able to handle current density as high as 3.0 mA/cm2, well above the minimum voltage of the battery. The Li metal/solid ionically conductive polymer material/NCM bipolar cell was pulse discharge tested for 5 sec pulse lengths at currents of 5, 20, 40, 80 and 120 mA. These currents correspond to 0.125, 0.5, 1.0, 2.0, and 3.0 mA/cm2 current density, respectively. All of the currents utilized here were readily handled by the cell, with the minimum voltage significantly above the 9 V minimum voltage for the cell.

Example 6

Figure 3:
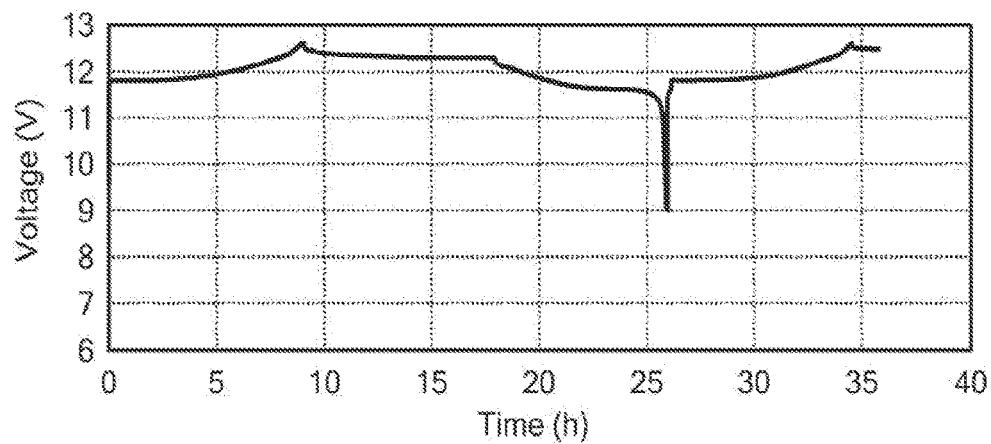
FIG. 3 is cycle plot of a battery described in Example 6.

The bipolar pouch cells (batteries) from Example 4 were additionally tested to determine voltage stability, performance, cycling efficiency and shelf life Specifically, one of the bipolar pouch cells comprising a LCO cathode was cycled with a nine (9) hour rest after charge. Referring to FIG. 3, the charge voltage exceeds 12 volts on the first cycle, and which is repeated in the second cycle. The nine (9) hour rest time after the initial charge demonstrates the voltage stability of the cell, since the open circuit storage voltage remains stable, and above 12 V during this time period.

Figure 4:
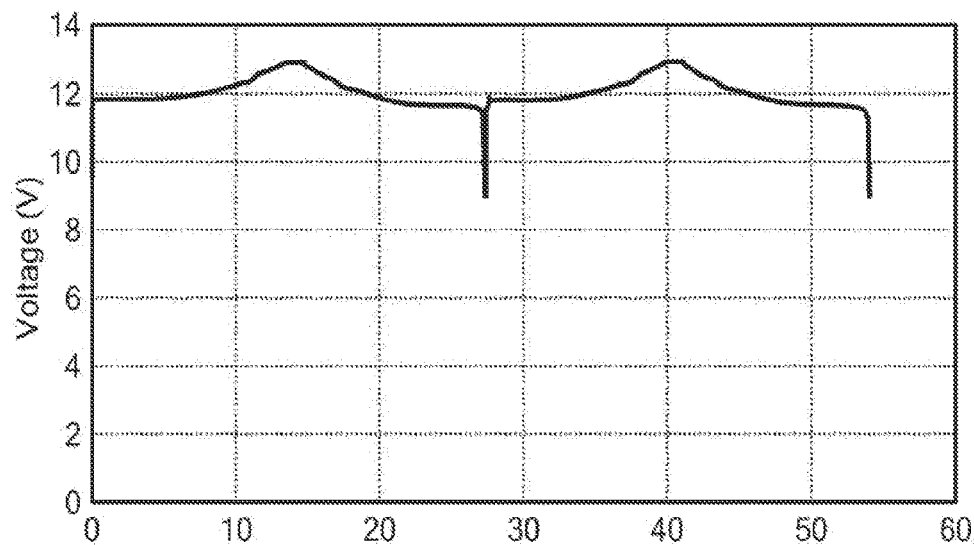
FIG. 4 is cycle plot of a battery described in Example 6.

Referring to FIG. 4 a longer discharge curve is shown which displays the entire second cycle. From the first two charge-discharge cycles a cyclic efficiency can be calculated using coulombs required for the charge, and coulombs derived during discharge. The coulombic measurements can be normalized relative to the weight of the electrochemically active cathode material for a mAh/gram capacity measurement. The discharge value is divided by the charge value for a cycle and multiplied by 100 to yield a n-cycle efficiency. The first cycle charge capacity was calculated to be 162.8 mAh/g, with the associated discharge capacity 146.3 mAh/g. In the second cycle, the first cycle charge capacity was calculated to be 149.1 mAh/g, with the associated discharge capacity 148.6 mAh/g for a second cycle cyclic efficiency of over 99%.

Figure 5:
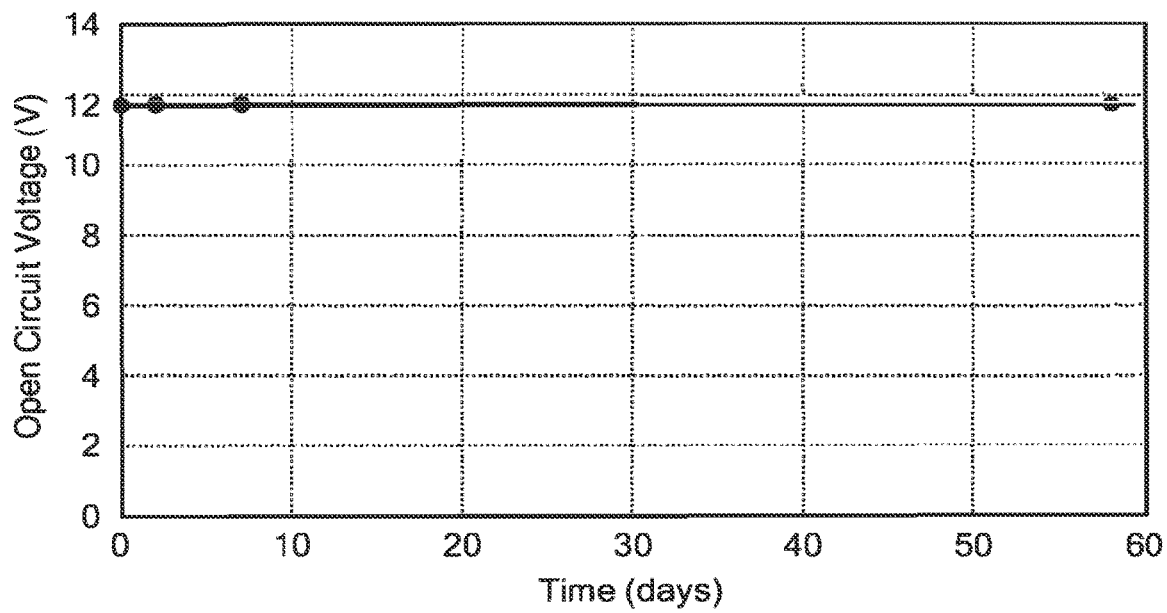
FIG. 5 is open circuit voltammetry plot of a battery described in Example 7.

Referring to FIG. 5, there is shown an open circuit voltage plot of the same bipolar pouch cell over many days. To the extent there was shorting, bridging or other interaction between the electrodes the OCV would show a change. However, the bipolar cell is stable over a many week time period.

Example 7

A bipolar battery was assembled using Li metal anodes, and sulfur cathodes incorporating sulfur electrochemically active material and the solid ionically conductive polymer material from Example 1, with an electrically conductive copper collector positioned there between to form a bipolar electrode. A film of the solid ionically conductive polymer material between the bipolar electrodes and interposed between adjacent anodes and cathodes. Three layers of anode/solid ionically conductive polymer material/cathode were used in the battery giving a total cell voltage of approximately 7.0 V (each sub-stack contributing ~2.33 V to the total bipolar battery voltage). Since the solid ionically conductive polymer material was used in this battery, no attempt was made to seal between the bipolar layers; all of the layers were stacked directly on top/adjacent of each other. This is in contrast to a liquid electrolyte system, where great care and elaborate cell design is needed to ensure that the liquid electrolyte is sealed and does not cross over from one bipolar cell stack to another, shorting the battery.

Figure 6:
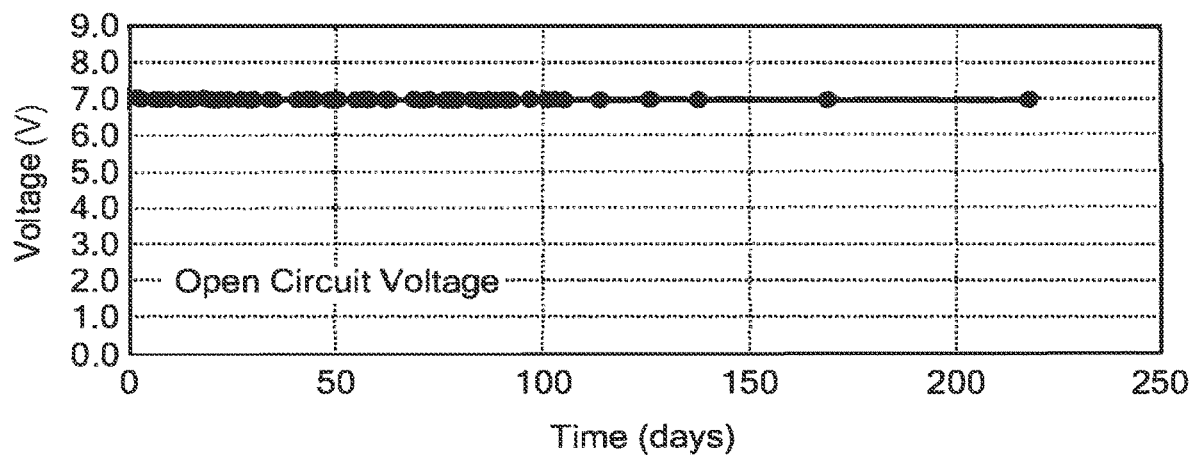
FIG. 6 is open circuit voltammetry plot of a battery described in Example 7.

After assembling the bipolar battery using the described electrodes and polymer electrolyte, the battery was vacuum sealed in aluminum laminate pouch material. The open circuit voltage of the bipolar battery was monitored over several months to determine the stability of the cell. A stable cell chemistry would be expected to have an open circuit voltage that is stable over time. The results are presented in FIG. 6, which show OCV stability at the predicted 7.0 Volts for over one half year.

Figure 7:
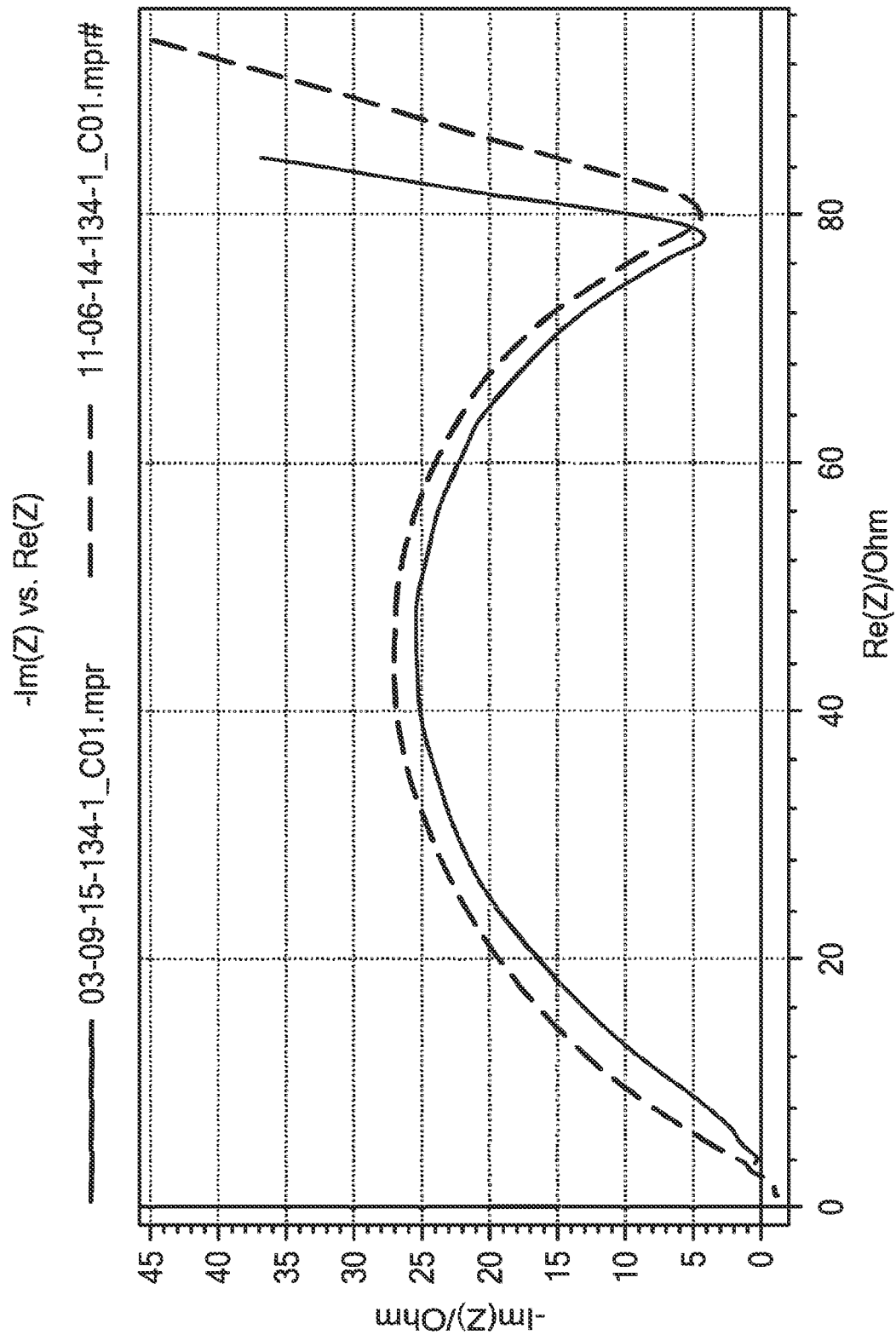
FIG. 7 is an impedance plot of a battery described in Example 7.

During a four-month storage of the bipolar Li/Sulfur cell, the impedance change was very slight, and varied over time, most likely due to slight changes in room temperature during the impedance measurement. Referring to FIG. 7 which includes the initial impedance and the 4-month storage impedance, which are virtually identical, the cell does not change in impedance over several months of storage—thus the cell has very stable components.

These data are indicative of a stable electrochemical system and shows that the use of this applications polymer electrolyte in the cathode and as the solid ionically conductive polymer material for this bipolar system provides a stable battery. One skilled in the art can see that this invention leads to great flexibility in the practical application of these bipolar batteries. The number of bipolar cell layers can be varied to produce the desired output voltage to meet the needs of the particular device. Thus, high output voltages can be delivered by a single, compact and energy dense bipolar battery.

Example 8

Additional bipolar batteries were assembled using two or three bipolar cell stacks. These bipolar batteries were constructed using $MnO_2$ cathodes (MnO2 mixed with the solid ionically conductive polymer material, and an electrically conductive graphite or similar material) and Aluminum anodes, both containing the solid ionically conductive polymer material. The solid ionically conductive polymer material was prepared according to Example 1, however the ionic compound used was lithium hydroxide monohydride. Alkaline liquid electrolyte (potassium hydroxide solution) was used and properly sealed in these cells. No cell shorting or electrolyte leakage was observed. These cells have demonstrated capabilities to power electronic devices such as iPod Nano, LED lights, etc. While the invention has been described in detail herein in accordance with certain aspects thereof, many modifications and changes therein may be affected by those skilled in the art without departing from the spirit of the invention.

Accordingly, it is our intent to be limited only by the scope of the appending claims and not by way of the details and instrumentalities describing the embodiments shown herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A battery comprising:
a positive electrode comprising a first electrochemically active material;
a negative electrode comprising a second electrochemically active material; and
one or more electrolyte layers, wherein each of the one or more electrolyte layers each comprise a solid ionically conductive polymer material comprising a polymer, a dopant, and an ionic compound, and wherein the solid ionically conductive polymer material comprises at least one cationic diffusing ion and at least one anionic diffusing ion.

2. The battery of claim 1, wherein the at least one cationic diffusing ion and/or the at least one anionic diffusing ion is mobile in the glassy state.

3. The battery of claim 1, wherein the positive electrode and the negative electrode each comprise a sub-stack which also includes an electrolyte layer, wherein each sub-stack is separated from an adjacent sub-stack by an electrically conductive sheet, wherein each sub-stack has a voltage, and the voltage of each sub-stack is equal to or less than 3 volts.

4. The battery of claim 3 further comprising a second sub-stack comprising a second separator layer comprising a solid ionically conductive polymer electrolyte positioned between a second anode layer and second cathode layer, wherein said second sub-stack is positioned adjacent to and in electrical but not in ionic communication with the first sub-stack and further comprising a current collector layer positioned adjacent to the second sub-stack.

5. The battery of claim 1, wherein the first electrochemically active material comprises zinc, aluminum, lithium, an intercalation material, a lithium oxide comprising nickel, cobalt or manganese, lithium nickel cobalt aluminum oxide; lithium nickel cobalt manganese oxide, lithium iron phosphate, lithium manganese oxide; lithium cobalt phosphate or lithium manganese nickel oxide, lithium cobalt oxide, LiTiS2, LiNiO2, or combinations thereof.

6. The battery of claim 1, wherein the second electrochemically active material comprises manganese dioxide, sulfur, an intercalation material, or combinations thereof.

7. The battery of claim 1 wherein the positive electrode comprises the solid ionically conductive polymer material.

8. The battery of claim 1 wherein the negative electrode comprises the solid ionically conductive polymer material.

9. The battery of claim 1, wherein the solid ionically conductive polymer material has a crystallinity greater than 30%.

10. The battery of claim 1, wherein the solid ionically conductive polymer material further comprises a plurality of charge transfer complexes.

11. The battery of claim 10, wherein the solid ionically conductive polymer material comprises a plurality of monomers, and wherein each charge transfer complex is positioned on a monomer.

12. The bipolar battery of claim 1, wherein the electronic conductivity of the solid ionically conductive polymer material is less than $1 \times 10^{-8}$ S/cm at room temperature.

13. The battery of claim 1, wherein the ionic conductivity of solid ionically conductive polymer material is greater than $1.0 \times 10^{-5}$ S/cm at room temperature.

14. The battery of claim 1, wherein the melting temperature of the solid ionically conductive polymer material is greater than 250° C.

15. The battery of claim 1, wherein the solid ionically conductive polymer material is a thermoplastic.

16. The battery of claim 1, wherein a cationic transference number of the solid ionically conductive polymer material is greater than 0.5 and less than 1.0.

17. The battery of claim 1, wherein at least one anionic diffusing ion comprises hydroxide, fluorine or boron.

18. The battery of claim 1, wherein the solid ionically conductive polymer material comprises a plurality of monomers, wherein each monomer comprises an aromatic or heterocyclic ring structure positioned in the backbone of the monomer and the solid ionically conductive polymer material further includes a heteroatom incorporated in the ring structure or positioned on the backbone adjacent the ring structure.

19. The battery of claim 1, wherein at least one of the one or more electrolyte layers is in the form of a film having a thickness of between 200 and 10 micrometers.

20. The battery of claim 1, wherein the dopant is selected from the group consisting of: quinones, 2,3-dicyano-5,6-dichlorodicyanoquinone ($C_8Cl_2N_2O_2$), tetrachloro-1,4-benzoquinone ($C_6Cl_4O_2$), tetracyanoethylene ($C_6N_4$), sulfur trioxide ($SO_3$), ozone ($O_3$), oxygen ($O_2$), air, transition metals, manganese dioxide ($MnO_2$), an electron acceptor, and combinations thereof.

* * * * *